June 15, 1965    J. C. OLSEN ETAL    3,188,739
MULTI-DIRECTIONAL OPTICAL TARGET
Filed Oct. 5, 1962    2 Sheets-Sheet 1

INVENTORS
JOSEPH C. OLSEN
ORAN K. PERCY
By
Agent

June 15, 1965

J. C. OLSEN ETAL 3,188,739

MULTI-DIRECTIONAL OPTICAL TARGET

Filed Oct. 5, 1962

2 Sheets-Sheet 2

INVENTORS
JOSEPH C. OLSEN
ORAN K. PERCY

By
Agent

United States Patent Office 3,188,739
Patented June 15, 1965

3,188,739
MULTI-DIRECTIONAL OPTICAL TARGET
Joseph C. Olsen, Sunnyvale, and Oran K. Percy, Milipitas, Calif., assignors to Lockheed Aircraft Corporation, Burbank, Calif.
Filed Oct. 5, 1962, Ser. No. 228,634
1 Claim. (Cl. 33—74)

The present invention relates in general to optical targets for optically aligning and measuring structures requiring precision alignment and measurement, and in particular to an optically transparent sphere having a sighting point located at the geometric center thereof.

Heretofore, the construction of certain types of large structures, for example, a radio telescope antenna, which is of odd shape and has a concave surface, was extremely difficult. A conventional optical target is flat and therefore cannot be viewed accurately from an angle, nor is it readily squarable to a center line when it must be tilted to square to the line of sight for proper union. In order to avoid some of the disadvantages of the conventional optical target, a hemispherically shaped optical target was developed that could be viewed at an oblique angle through the sighting lens system of a transit, thus obviating the need for a complex arrangement of mirrors. This hemispherical target, while being an improvement over conventional systems, still had several disadvantages; for example, accurate physical measurements were difficult to obtain, and the target could be viewed from an extremely limited range of angles.

The object of the present invention is to provide a multidirectional optical target which is spherically shaped to give an undistorted view of the target from at least 345 spherical degrees.

Another object of this invention is to provide an optical target which allows both optical and/or physical measurements to be obtained to the center of a target.

It is still another object of the present invention to provide a spherical optical target in which the entire external surface thereof is a lens to prevent distortion of light traveling through the center of this lens.

Figure 1:
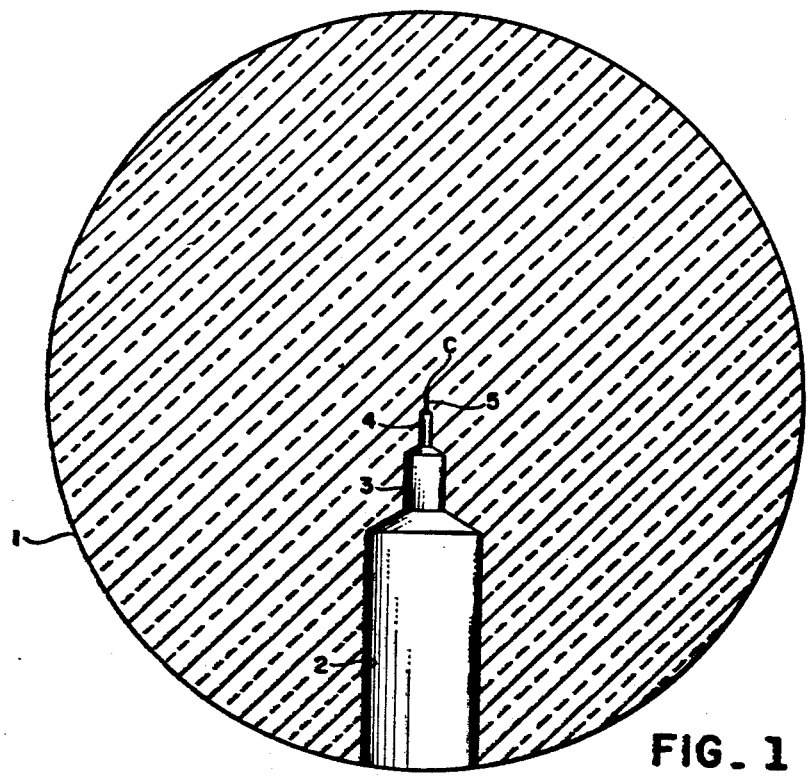
Figure 2:
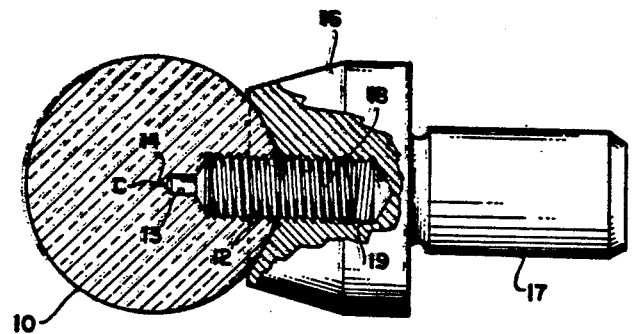
Figure 3:
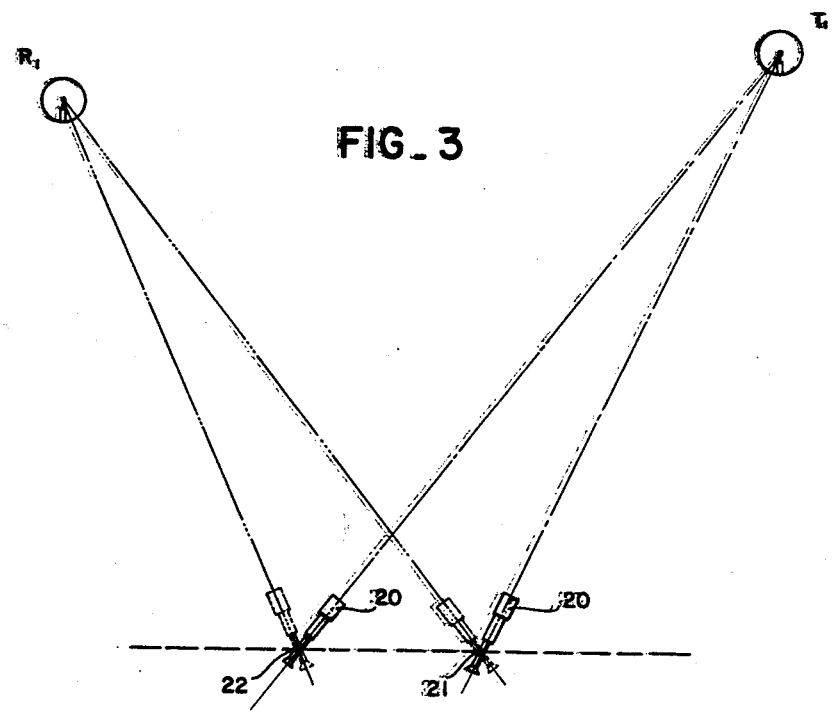

These and other objects and features of the present invention will become apparent upon a perusal of the following specification and drawings, of which:

FIG. 1 is a cross-sectional view of the optical target;
FIGURE 2 is a cross-sectional view of an alternative embodiment of an optical target;
FIGURE 3 is a view showing the optical target in use for measuring the distance and/or alignment between two points in space.

Referring to FIGURE 1, the optical target includes an optically transparent sphere 1 as of, for example, optical quality Plexiglas or Lucite. An advantage in using a sphere is that its outer surface serves as a lens to prevent distortion of light traveling through the center thereof. What is desired is to position a sighting point in the exact geometric center C of the sphere. One way to accomplish this is by drilling a series of concentric holes of descending radius along a diameter of sphere 1 to the center C of sphere 1. A hole 2 is drilled into sphere 1 along any diameter thereof. Hole 2 may be of any convenient diameter and depth; for example, a diameter of ½" to a depth of ⅞" in a sphere approximately 3½" diameter. A second hole 3, concentric with hole 2 and, for example, ⅛" diameter, is drilled to within approximately ³⁄₁₆" of the geometric center C of sphere 1. Concentric with holes 2 and 3, a third hole 4, for example, ¹⁄₃₂" diameter, is drilled in the bottom of hole 3 to within approximately ¹⁄₁₆" of the geometric center C of sphere 1. Target hole 5, as of, for example, .004 inch in diameter and concentric with holes 2, 3, and 4, is drilled as close as possible to the center C of sphere 1. The tip of hole 5 would ideally be situated at exactly the geometric center C of sphere 1 of FIGURE 1. In actual practice center C may be placed to within 0.0002" of the exact center of sphere 1.

It is herein noted that any other convenient means of placing a sighting point or mark at the center C of sphere 1 may be provided. For example, a single hole may be drilled along a diameter of sphere 1, with the apex of the drilled hole being centered as near as possible to center C of the sphere. It would also be possible to cut the sphere in half and mark the center C thereof, and then cement the two halves together with an optically transparent cement.

Another way to position a sighting point or mark at the center of a sphere is to suspend a drop of luminescent material at the end of a Lucite thread and mold the sphere around the target.

One example of a use of a pair of targets would be to obtain a precise distance between two points in space. A pair of multi-directional optical targets are placed, one each, at reference point R1 and target point T1 as shown in FIGURE 3. A theodolite 20 is positioned at the first of two given points 21 and 22 and the precise angular measurement from the line between the first and second point to R1 and T1 is taken. Theodolite 20 is then moved to a second point 22 which is a known distance from point 21 and the precise angular measurement to R1 and T1 is again taken. By using well known means, the distance between R1 and T1 may be mathematically calculated. Measurements of this type are extremely accurate and are becoming more frequently needed in the large precision missiles and antennas becoming more common. Further, measurements and sightings may be taken from almost any direction, as the sighting point at center C is clearly visible from approximately 345 spherical degrees. It is, of course, possible to use any combination of optical targets as so desired to accomplish any number of objectives. For example, a single optical target could be used to find the precise intersection of two given lines. The many uses of the present configuration are obvious to any person skilled in the art.

FIGURE 2 is an illustration of a use of the concept and principles of the multi-directional optical target of FIGURE 1, with existing tool-building procedures and technology to replace the standard ½" diameter tooling ball with the added features of optical alignment capability. An optically transparent sphere 10 substantially similar to sphere 1 of FIGURE 1, is provided with four concentric holes of descending diameter bored along a diameter of the sphere to within 0.0002" of the geometric center of sphere 10. Assuming, for example, sphere 10 is to replace the standard ½" steel tooling ball, sphere 10 would be ½" diameter. A threaded ⅛" diameter hole 12 would be drilled to approximately ¼" of the center of sphere 10. Concentric with hole 12, second and third holes 13 and 14 are drilled, with third hole 14 approximately .004 inch in diameter drilled to within 0.0002" of the center of the sphere. The tip of hole 14 would be located approximately in the geometric center of sphere 10.

Sphere 10 is mounted upon base 16 having a post 17 projecting outwardly therefrom for attaching the target to the structure to be measured and/or optically centered. Base 16 has a concave, cupped end with a threaded hole 19 drilled in the bottom portion thereof and concentric with post 17. Sphere 10 is securely mounted in the concave cupped portion of base 16 by means of a threaded stud 18 mating with the threaded holes 12 and 19 of sphere 10 and base 16 respectively.

In using a multi-directional optical target as shown in FIGURE 2 as a replacement for the solid steel tooling ball, the sphere 10, along with its base 16 of FIGURE 2, is positioned at any point R1 in which a bushing is provided to receive post 17. If, for example, a precise measurement or alignment must be made from point R1 to T1 of FIGURE 3, the standard procedure is to use steel measuring bars and steel balls. If the distance becomes large, or the two points to be measured are at such a disposition that no straight line measurement can be made, a second optical target 10 may be positioned at any convenient position close to the second target T1. In this manner, the precise positioning of T1 may be optically measured, thereby removing the possibility of errors due to sag in the measuring tool and/or errors in the measuring tool due to temperature.

In addition to using multi-directional optical target sphere 10 for mechanical measurements, since the sphere 10 is transparent, it may be readily available to optically align a pair of objects. It is further noted that the inner surface of the drilled portion of the sphere as shown in FIGURES 1 and 2 may be left in its "rough" condition to clearly outline the silhouette of the geometric center of the sphere. The drilled surface may also be cleaned if so desired, and a small amount of luminous material inserted at the geometric center of the sphere. Any desired method of getting the geometric center of the sphere to clearly stand out may be provided within the spirit and scope of the invention. It is also possible to insert a light in the outer hole to light up the geometric center of the sphere.

These and many other uses and alterations, modifications and substitutions thereof may be made to the instant disclosure without departing from the spirit and scope of the invention as defined by the appended claim.

What is claimed is:

An optical target for determining optical and physical measurements through the center thereof comprising a spherical member, said spherical member being substantially optically transparent and including an outer surface which is a lens to prevent distortion of light through the center thereof, said spherical member further including the tip of a hole sunk along a radius of said spherical member defining a sighting point, said hole sunk in said spherical member adapted to receive a light therein to illuminate the tip of said hole, said spherical member further including a base member connected thereto, said base member comprising a concave portion at one end and a post extending from the other end thereof, and stud means connected to the concave portion of said base member concentric with said post, said stud means adapted to receive said spherical member thereon.

References Cited by the Examiner

UNITED STATES PATENTS

| | | | |
|---|---|---|---|
| 2,361,423 | 10/44 | Snyder | 120—82 X |
| 2,538,475 | 1/51 | Skrastin | 33—74 X |
| 2,706,335 | 4/55 | Munsey | 33—47 |
| 3,107,450 | 10/63 | Snyder et al. | 33—47 X |

FOREIGN PATENTS 600,005  3/48  Great Britain.

ISAAC LISANN, *Primary Examiner.*